United States Patent
Schipper

(10) Patent No.: US 8,551,437 B2
(45) Date of Patent: Oct. 8, 2013

(54) PROCESS FOR THE MANUFACTURE OF P4O6 WITH IMPROVED YIELD

(75) Inventor: Willem Johan Schipper, Middelburg (NL)

(73) Assignee: Straitmark Holding AG, Zug (CH)

( * ) Notice: Subject to any disclaimer, the term of this patent is extended or adjusted under 35 U.S.C. 154(b) by 299 days.

(21) Appl. No.: 13/128,982

(22) PCT Filed: Nov. 11, 2009

(86) PCT No.: PCT/EP2009/064988
§ 371 (c)(1),
(2), (4) Date: Jul. 13, 2011

(87) PCT Pub. No.: WO2010/055056
PCT Pub. Date: May 20, 2010

(65) Prior Publication Data
US 2011/0264267 A1    Oct. 27, 2011

(30) Foreign Application Priority Data

Nov. 12, 2008 (EP) .................................. 08168898

(51) Int. Cl.
*C01B 25/12* (2006.01)
(52) U.S. Cl.
USPC .......................................................... 423/304
(58) Field of Classification Search
USPC .......................................................... 423/304
See application file for complete search history.

(56) References Cited

U.S. PATENT DOCUMENTS

| | | | | |
|---|---|---|---|---|
| 2,907,635 A * | 10/1959 | Tucker | ........................... | 423/304 |
| 2,988,426 A * | 6/1961 | Cross et al. | .................... | 423/304 |
| 3,034,860 A * | 5/1962 | McCollough, Jr. | ........... | 423/304 |
| 3,077,382 A * | 2/1963 | Klein et al. | .................... | 423/304 |
| 3,532,461 A * | 10/1970 | Whyte et al. | ................... | 423/304 |
| 4,219,533 A * | 8/1980 | Hartlapp et al. | ............... | 422/200 |
| 4,379,131 A * | 4/1983 | Daniel et al. | ................... | 423/304 |
| 4,450,146 A * | 5/1984 | Klepeis | ........................... | 423/304 |
| 4,525,329 A * | 6/1985 | Kuxdorf et al. | ................ | 422/202 |
| 4,603,039 A * | 7/1986 | Kuxdorf et al. | ................ | 423/304 |
| 4,618,483 A * | 10/1986 | Spruill et al. | .................. | 423/304 |
| 4,777,025 A * | 10/1988 | Kowalski et al. | .............. | 423/304 |
| 7,976,811 B2 * | 7/2011 | Schipper | ........................ | 423/304 |
| 8,323,605 B2 * | 12/2012 | Schipper | ........................ | 423/304 |

FOREIGN PATENT DOCUMENTS

| | | |
|---|---|---|
| DE | 1172241 | 1/1965 |
| DE | 116457 | 11/1975 |
| DE | 216465 | 12/1984 |
| DE | 216516 | 12/1984 |
| DE | 3319606 | * 12/1984 |
| DE | 292213 | 7/1991 |
| DE | 292637 | 8/1991 |
| DE | 3319606 | 2/1992 |

* cited by examiner

*Primary Examiner* — Wayne Langel
(74) *Attorney, Agent, or Firm* — Samuel Digirolamo; Husch Blackwell LLP

(57) ABSTRACT

A process for the production of a reaction product consisting essentially of $P_4O_6$ is carried out by reacting oxygen with phosphorus in an exothermic reaction in a reaction unit. Heat created by the exothermic reaction is removed by feeding $P_4O_6$ and/or by-products of the process into the reaction unit. The generated reaction product is then quenched to a lower temperature where no essential decomposition of the reaction product occurs, and at least part of $P_4O_6$ is separated from the reaction product obtained after quenching. The resulting yield of $P_4O_6$ based on the phosphorus used is improved and the heat of the exothermic reaction can be controlled in an economic way.

12 Claims, No Drawings

PROCESS FOR THE MANUFACTURE OF P4O6 WITH IMPROVED YIELD

CROSS REFERENCE TO RELATED APPLICATIONS

This application is a U.S. National Phase Application of International Application PCT Application No. PCT/EP2009/064988, filed on Nov. 11, 2009, which claims the benefit of priority from European Patent Application No. 08168898.8, filed on Nov. 12, 2008. The disclosures of International Application PCT Application No. PCT/EP2009/064988 and European Application 08168898.8 are incorporated herein by reference.

The invention relates to a process for the manufacture of phosphorus(III)oxide with the empirical formula $P_4O_6$, made by the reaction of phosphorus and oxygen wherein the reaction product is obtained with high yield and in essentially pure form. It forms, therefore, an excellent "basic material" (which term when used herein shall always include its use as a starting material, raw material and intermediate) in the manufacture of organic phosphorus(III)compounds, an industrially important class of chemicals. The term "$P_4O_6$" as used herein is intended to encompass all formulas conventionally used for phosphorus(III)oxides like $P_2O_3$ (phosphorus trioxide).

$P_4O_6$ has not previously been prepared on a commercial scale, and although already proposed it has not been commercially used, for example as a basic material for the manufacture of organic phosphorus(III)compounds. Instead of using $P_4O_6$ as a raw material, such chemicals are usually made starting from phosphorus trichloride ($PCl_3$). However, the application of $PCl_3$ has several disadvantages. It requires the use of a large amount of chlorine to react with white phosphorus. $PCl_3$ contains only 22.7 weight percent of phosphorus, and, moreover, intermediates and end products to be made from $PCl_3$, usually do not contain chloride. Consequently chlorine is released in the form of considerable amounts of undesired by-products, including often hydrochloric acid, to be separated in complex and expensive process steps. Local circumstances may allow sale as low-value by-product, but disposal is necessary in many cases.

Alternatively to $PCl_3$, phosphorous acid, $H_3PO_3$, can be used as the basic material in a number of production processes, thus avoiding part of the adverse effects associated with $PCl_3$. However, $H_3PO_3$ is also made commercially from $PCl_3$, by hydrolysis, which implies that the disadvantages associated with the presence of chlorine will still appear, only at a different stage in the production chain. Moreover, $H_3PO_3$ has the drawback to show a markedly different reactivity compared to $PCl_3$.

The use of its corresponding anhydride, $P_4O_6$, would not show said disadvantages which would allow using it as such basic material in a broader range of chemistry. Further, its phosphorus content is markedly higher than that of $PCl_3$ or $H_3PO_3$, making it the most concentrated source of trivalent phosphorus, and thus it would be the more valuable and suitable basic material in chemical synthesis.

The disclosed processes to manufacture $P_4O_6$ are commonly carried out by direct reaction of white phosphorus and oxygen in stoichiometric quantities. The reaction mixture is generated in a flame which without cooling can reach temperatures up to 6000 K. It is known that $P_4O_6$ is unstable and decomposes at temperatures above 700 K, forming unwanted oxides of phosphorus (particularly mixed P(III/V)oxides and phosphorus suboxides) and elemental phosphorus. Therefore, many proposals were made how to quench and cool the obtained reaction mixture immediately and effectively, to avoid decomposition and to obtain a product of high yield and purity becoming suitable as the basic material in the manufacture of commercially important phosphorus(III)compounds.

The process for manufacturing $P_4O_6$ as described in DD 216516 A1 comprises steps of combining the reactants, evaporated phosphorus and an oxygen-inert gas mixture, in a mixing nozzle. The reaction occurs in a reactor generating a mixture of phosphorus oxides at a temperature between 2000 and 6000 K depending on the quantity of inert gas used. The reaction mixture passes the reactor after a very short residence time not exceeding 0.005 seconds. Since $P_4O_6$ is instable in the temperature range between 1500 and 700 K, the reaction mixture is kept in the reactor at a temperature of 1600 to 1200 K only for a very short time and then rapidly cooled below 700 K, and finally to 300 K, which means in three steps avoiding decomposition of the reaction mixture. In a first cooling step the reaction product is rapidly cooled in the reactor leaving the reactor with a temperature between 1600-1200 K by adding a suitable amount of inert gas into the reactor and further by cooling the wall of the reactor, for example with water. That first cooling step is carried out in a reactor at a rate of $0.1*10^6$ to $10*10^6$ $Ks^{-1}$. After leaving the reactor the reaction mixture is further rapidly cooled in a second cooling step immediately following the first cooling step. Hereby the same high cooling rate as used in the first cooling step is employed, preferably by adding large quantities of inert gas to the reaction mixture, cooling down to a temperature of about 700 K. Finally in a third cooling step the reaction mixture is cooled indirectly and condensed to below 300 K. Optionally during the last cooling step liquid $P_4O_6$ or liquid reaction mixture is added to form a liquid film on the inside wall of the cooling means to avoid condensation of by-products and resulting in scaling and obstruction on the inner surface of the cooling means. The reaction mixture is then purified, for example by distillation. As it is stated in examples 2 and 3 of this publication, according to which liquid $P_4O_6$ or liquid reaction mixture is added to the reaction mixture in the third cooling step, the yield is only 80.8%, and 75.9% respectively, of $P_4O_6$ based on the weight of phosphorus used. So this process is generally not suitable to manufacture $P_4O_6$ in yields of commercial interest.

The process for manufacturing $P_4O_6$ as proposed by DD 292213 A5 uses the same principle as mentioned in DD 216516 A1, reacting gaseous phosphorus and oxygen in a reactor, but uses modified cooling steps. First, indirect cooling decreases the temperature of the gaseous reaction mixture to 1000-750 K. In the following cooling step the reaction product is condensed by external cooling with water and further by adding liquid $P_4O_6$ or liquid reaction mixture as coolant and to form a liquid film on the inner surface of the cooling means thus avoiding condensation of by-products, scaling and obstruction on that inner surface of the cooling means. The yield of $P_4O_6$ based on the phosphorus used is about 85% which means it is not essentially improved compared with the process of DD 216516 A1.

Also DD 292637 A5 discloses a process for manufacturing $P_4O_6$ by reacting phosphorus and oxygen in a mixture with nitrogen in a tubular reaction chamber with the object that the reaction product obtained by this process will have a lower content of unwanted oxides of phosphorus. For this purpose a specifically designed tubular segment is used aimed at mixing the gas stream. This segment is placed between the tubular reaction chamber and a quenching unit. The inner cross section of the tubular segment is smaller than the inner cross section of the tubular reaction chamber. The reaction chamber is externally cooled with water, and the reaction product leaving the reaction chamber with a temperature between 2200 and 1600 K is fed into the tubular segment which is externally cooled with air. Due to that specific design of the tubular segment the temperature of the reaction product distributed over the cross section of the tubular segment shall become more homogeneous before it enters the quenching unit. After the reaction mixture is cooled down to a temperature of 1000 to 750 K, in the following cooling step the reaction mixture is further cooled externally with water, and also internally by adding liquid $P_4O_6$ and/or liquid reaction mixture, preferably on the inner surface of the cooling means, hereby cooling the reaction mixture down to a temperature of preferably less than 600 K. Then further cooling is applied in the following quenching step. That quenching step uses again liquid $P_4O_6$ or liquid reaction mixture reducing scale forming of by-products on the inside wall of the cooling and quenching means, but again obviously does not lead to an improved yield of $P_4O_6$ based on the phosphorus used. It is about 85% which means not essentially higher than those achieved with the process described in DD 216516 A1 and DD 292213 A5.

Yields of about 85% or less means that the reaction product contains a high amount of unwanted by-products of different oxides of phosphorus and a significant amount of elemental phosphorus which pose a separation and disposal challenge. It is possible to separate the by-products from the product stream by commonly known techniques, but the commercial value of these solids is limited. Applying them in derivatives chemistry, such as submitting the material to hydrolysis or alcoholysis, will lead to a mixture of P(III)- and P(V)-based derivatives which has severe commercial disadvantages compared to the analogous derivatives made from either pure P(III)oxide or P(V)oxide.

Also, the fraction made up by phosphorus suboxides is seen to be unreactive under normal reaction conditions for such derivatives chemistry. For instance in hydrolysis and alcoholysis, only the mixed P(III/V) oxides are seen to react. The suboxides are inert under the conditions applied, and remain as a suspension in the end product. This poses a separation challenge, a disposal problem and a decrease in yield (based on phosphorus). The occurrence of a significant amount of these unwanted by-products is therefore seen to have a negative influence on the economics of the known $P_4O_6$ processes, as up to 20% of the phosphorus is lost to a stream of little or no commercial value.

Further the processes for manufacturing $P_4O_6$ of the prior art do not lead to a product suitable as a basic material for commercially manufacturing organic phosphorus(III)compounds, because $P_4O_6$ is not obtained in sufficient quality, in view of its high content of elemental phosphorus ($P_4$) dissolved in $P_4O_6$. $P_4O_6$ is a liquid at temperatures slightly above room temperature, and when made according to the known processes it contains elemental phosphorus up to its maximum solubility in $P_4O_6$. Such content of elemental phosphorus may be up to 10 percent as mentioned in DD 116457 A1 and DD 216465 A1. DE 1172 241 B discloses a process for manufacturing $P_4O_6$ with a phosphorus content between 1 and 10%, but the yield of $P_4O_6$ is very low. Especially phosphorus is an impurity difficult to remove by distillation because its boiling point and vapour pressure are relatively close to those of $P_4O_6$. Whereas the processes for manufacturing $P_4O_6$ of the prior art propose various methods to obtain phosphorus oxide of the desired +3 oxidation state with limited formation of oxides with different oxidation states, a method to reduce the content of elemental phosphorus in the reaction product has not been disclosed.

Accordingly elemental phosphorus necessarily remains in the $P_4O_6$ when it is used as a basic material in derivative chemistry. This is of great disadvantage especially when reactions in watery or otherwise polar media are carried out. This leads to the formation of a phosphorus emulsion or suspension, because $P_4$ has poor solubility in polar media. The appearance of such an emulsion or suspension poses an important separation challenge, as $P_4$ is toxic and pyrophoric and thus requires extensive investments to ensure its safe and reliable removal and disposal. The presence of elemental phosphorus seriously reduces the potential of economical applications of $P_4O_6$.

It is therefore an object of the invention to find a process for the manufacture of $P_4O_6$ avoiding these disadvantages of the processes described in the prior art which means allowing the synthesis of $P_4O_6$ in higher yields, and reducing or eliminating the amount of by-products as occurring in the known processes.

It is a further object of the invention to provide $P_4O_6$ obtained by reaction of phosphorus and oxygen, in high purity and being essentially free of by-products such as mixed P(III/V) oxides, phosphorus suboxides and elemental phosphorus, thus showing excellent properties when used as a basic material in further chemical reactions, especially when used for the manufacture of organic phosphorus(III)compounds, and to create a production process for the manufacture of $P_4O_6$ of that high quality.

These objects are surprisingly achieved by a process for the production of a reaction product consisting essentially of $P_4O_6$ by reacting oxygen, or a mixture of oxygen and an inert gas, with gaseous or liquid phosphorus in an exothermic reaction in a reaction unit maintaining an average temperature in said reaction unit suitable to generate the reaction product, by removing heat created by the exothermic reaction by feeding $P_4O_6$ and/or by-products obtained from earlier reactions or from the running process into the reaction unit, then quenching the generated reaction product in one or more quenching unit(s) to a lower temperature where no essential decomposition of the reaction product occurs, and separating at least part of $P_4O_6$ from the reaction product obtained after quenching.

Carrying out the process for the production of a reaction product consisting essentially of $P_4O_6$ is performed as follows. First, oxygen, or a mixture of oxygen with an inert gas, such as nitrogen, is reacted with gaseous or liquid phosphorus in essentially stoichiometric amounts to form $P_4O_6$ in a reaction unit generating the reaction product in that reaction unit. Heat created by the exothermic reaction of phosphorus and oxygen in the reaction unit is removed to keep the reaction in that reaction unit at an average temperature below 2200 K and above 1500 K which is generally suitable to generate the reaction product. Removing the heat is achieved by adding $P_4O_6$ or by-products, such as obtained from earlier reactions producing the reaction product or as a recycle from the current process, and/or adding a mixture of $P_4O_6$ and said by-products, into the reaction unit. The appropriate amounts of $P_4O_6$ and for by-products that must be fed into the reaction unit to control the cooling of the reaction product in the reaction unit can be easily determined by someone skilled in the art and depend e. g. on the process parameters and the reaction unit. The said by-products generally consist of mixed oxides of $P^{3+}$ and $P^{5+}$, as well as of lower oxidation states of phosphorus than +3. Adding these products can preferably be made by recycling these materials obtained by the running process, and/or in a process carried out earlier, after quenching, for example adding $P_4O_6$ separated from the by-products and/or the resulting residue consisting of by-products after separation of $P_4O_6$.

This is followed by quenching the reaction product in one or more quenching unit(s) to a lower temperature where no essential decomposition of the reaction product occurs.

The quantities of the reactants phosphorus and oxygen are adjusted to be close to or correspond essentially to the theoretical stoichiometric amounts of $P_4O_6$, which means the molar ratio of phosphorus ($P_4$) to oxygen ($O_2$) should generally be in the range of 1:2.7 and 1:3.3. $P_4O_6$ and by-products consisting mainly of mixed higher P(III/V) oxides and phosphorus suboxides, or a mixture of $P_4O_6$ and said by-products, to be added as coolant to the reaction unit, are typically obtained from previous executions of the process and/or from the running process, thus recycling unwanted by-products, and are seen to have a similar molar $P_4$ to $O_2$ ratio.

Preferably the reaction unit is cooled to maintain an average temperature of the reaction product within the reaction unit between 1600 and 2000 K, particularly between 1650 and 1850 K.

The reaction product is then passed from the reaction unit to one or more quench units where it is rapidly cooled down, preferably in one step, to temperatures where no essential decomposition of $P_4O_6$ occurs. Generally such temperature is below 700 K. Such quenching can be carried out by leading the reaction product via cooling means, thus creating internal and/or external cooling. Preferably it is carried out by adding reaction product, preferably in liquid form already quenched, preferably produced by the same process, and/or adding more or less purified liquid $P_4O_6$ end product as a coolant to the reaction product. Optionally, the product is cooled in said quenching step, or in a separate cooling step following quenching, to temperatures that enable easy handling and/or processing the condensed reaction product, which means below the boiling point of $P_4O_6$, preferably below 350 K.

In one particular embodiment there is provided a process for the production of a reaction product consisting essentially of $P_4O_6$ by reacting oxygen, or a mixture of oxygen and an inert gas, with gaseous or liquid phosphorus in molar ratio of phosphorus ($P_4$) to oxygen ($O_2$) in the range of from 1:2.7 to 1:3.3 in an exothermic reaction in a reaction unit maintaining an average temperature in the range of 1500 to 2200K in said reaction unit suitable to generate the reaction product, by removing heat created by the exothermic reaction by feeding $P_4O_6$ and/or by-products obtained from earlier reactions or from the running process into the reaction unit, where the residence time of the reaction product in the reaction unit is at least 0.5 seconds, then quenching the generated reaction product in one or more quenching unit(s) to a temperature below 700K where no essential decomposition of the reaction product occurs, and separating at least part of $P_4O_6$ from the reaction product obtained after quenching.

For further use of the reaction product as a basic material to produce organic phosphorus(III) chemicals, and to allow the re-use of by-products in the reaction unit, it is advisable to purify the cooled and condensed reaction product, for example by distillation, separating $P_4O_6$ from solid and higher boiling by-products. The purified, preferably distilled product contains at least 96, preferably at least 97, especially 99 or more weight per cent of $P_4O_6$.

After quenching, at least part of $P_4O_6$ is separated from the reaction product obtained after quenching by any method known in the art to separate liquids from a mixture with solid products, preferably by distillation. The remaining residue of by-products, which are partly solid at room temperature, therefore said residue is also called "solids", and consist mainly of solid P(III/V) oxides and suboxides of phosphorus obtained by said separation step, or a fraction thereof containing that solid by-products and a more or less significant fraction of $P_4O_6$ as well, is fed into the reaction unit where they are evaporated and decomposed under the influence of heat generated in the reaction unit by the reaction of freshly dosed reactants, and take part in the reaction again, thus improving the yield of the process.

As a further advantageous effect, the by-products fed back to the reaction zone remove at least part of the heat created by the exothermic reaction of phosphorus and oxygen. The evaporation or sublimation, and decomposition of the by-products due to the heat generated by the reaction unit provide a considerable cooling effect on the contents of the reactor unit. Due to the exothermic nature of the process originating from the reaction of freshly dosed oxygen and phosphorus, the cooling requirements of the process to keep it at the desired operating temperature are considerable. The dosage of the stream of by-products may be adjusted and is generally sufficient to alleviate the need for any further external and/or internal cooling, making the apparatus less complicated and costly.

That stream of solids fed into the reaction unit consists either entirely of unwanted solid by-products obtained further downstream in the process, or of a mixture, for instance in form of a slurry, of the unwanted solids and a certain quantity of $P_4O_6$. Forming said slurry, $P_4O_6$ is generally not completely separated from the solids contained in the reaction mixture after quenching, and the residue is fed back into the reactor as a mixture/slurry of the solid by-products distributed in the liquid product $P_4O_6$. This preferred embodiment also eliminates the need to completely separate the solids as a dry side stream from the quenched product. Instead a thickening is sufficient, which may be achieved by methods known to those skilled in the art.

Using an amount of $P_4O_6$ together with the solid by-products in a mixture has the further advantage that the constituents of the solids of the by-products are made easier available again to the reaction, allowing for an easier dosage of the solids into the reactor compared to the dosage of only solids, but the more important object is to perform a cooling action on the contents in the reaction unit, preferably in amounts maintaining these in the reaction unit at the desired operating temperature preferably without any further external and/or internal cooling. However, additional cooling or heating may be performed by other means if necessary.

In order to meet the cooling requirements of the reaction unit more or less completely and to reach and maintain the operating temperature there, preferably without any additional external and/or internal cooling, in a preferred alternative embodiment of the process, the mass of the stream of the residue of by-products recycled to the reaction unit, for example in form of said slurry, is further adjusted, preferably by addition of a controlled amount of pure or impure $P_4O_6$ (containing, for example, higher boiling impurities of the process) to said mixture. Alternatively, or additionally, a separate stream, for instance of additional pure or impure $P_4O_6$, may be fed into the reaction unit to create an additional cooling effect.

In said preferred alternatives of the process, the solid by-products, or the mixture containing solid by-products and $P_4O_6$ forming a slurry, are fed back into the reactor unit in a stream of liquid $P_4O_6$ product, where that stream provides the full cooling requirement of the reaction unit by controlling the amount, temperature and composition of that stream, thus completely eliminating the need for any further active external and/or internal cooling by other means. The mass of the stream, its feeding temperature and the content of $P_4O_6$ in the stream may be adjusted to meet the exact cooling requirements of the reactor unit. Adjusting the cooling effect by dosing additional $P_4O_6$ to said stream is preferred, which can be made either by dosing directly into the reactor unit, and/or by adding it to the slurry of solid by-products.

Whereas it is preferred that the residue of by-products (particularly in form of said slurry) and optionally together with additionally pure or impure $P_4O_6$ is added to the reaction unit together with the freshly dosed stream of the reactants phosphorus and oxygen, optionally with an inert gas, said residue may also be fed into the reaction unit through a separate inlet. Oxygen, or a mixture of oxygen and an inert gas, like nitrogen, gaseous or liquid phosphorus, and a stream containing said residue of by-products of the process and optionally additional $P_4O_6$, are passed into the reaction unit where they are combined and where phosphorus and oxygen immediately react with each other in a strongly exothermic reaction generating the reaction product.

The resulting $P_4O_6$ separated from the reaction product after quenching is obtained in high yield based on the amount of phosphorus used, and shows excellent purity which makes it valuable as the basic material in the formation of organic phosphorus(III)compounds.

Surprisingly, although the residue of by-product separated from the liquid components of the reaction product after quenching consists of a mixture of different compounds, the overall stoichiometry of that mixture is at, or close to, the required O:P ratio for the production of $P_4O_6$. So it was surprisingly found that the constituent compounds, mainly phosphorus suboxides and mixed P(III/V)oxides, when added to the reaction unit decompose there to a mixture that is essentially identical to the reaction mixture obtained when only using a feed of phosphorus and oxygen (or optionally a mixture of oxygen and nitrogen), in the required stoichiometric ratio to form $P_4O_6$.

It is still a further object of the invention to provide $P_4O_6$ obtained by reaction of phosphorus and oxygen in high purity being essentially free of elemental phosphorus and unwanted phosphorus oxides, thus showing excellent properties when used as a basic material in further chemical reactions, especially when used for the manufacture of organic phosphorus (III)compounds.

This further object is surprisingly achieved by a preferred embodiment of the process, wherein the reaction mixture is maintained for a certain residence time of at least 0.5 seconds within the reaction unit, and, preferably, when the temperature of the reaction unit is kept within the preferred range of 1600 and 2000 K. As a further effect, these preferred conditions ensure a complete evaporation, sublimation and dissociation of the solids-$P_4O_6$ mixture returned to the reactor unit. A residence time of about 1 second would already lead to the effect that a reduced content of elemental phosphorus within the final product of less than 1 weight percent is achieved. When a residence time of 1 second or more, for example between 1 and 8 seconds, is used, the content of elemental phosphorus in the reaction mixture becomes very low and the yield of $P_4O_6$ will reach an optimal value. The remaining elemental phosphorus is present the final product in a quantity between 1 and 0.5 weight percent or less. Further, that residence time shows the advantageous effect that all dosed recycled material fed into the reaction unit are transferred into gaseous or vaporous form and were completely decomposed. By choosing a residence time of more than 8 seconds, preferably up to 30 seconds a content of 0.5 or less, preferably less than 0.25 weight percent of elemental phosphorus will be present in the final product, and the yield of $P_4O_6$ is also very high. A residence time of more than about 40, especially more than 60 seconds does not lead to any essential further improvement with regard to the composition of the reactor contents, which is of influence on the yield and the content of the elemental phosphorus in the final product. In the process a residence time as disclosed herein in combination with the specific average temperature of 1600 to 2000 K is employed at the same time.

The residence time expresses how fast the reaction product moves through the volume of the reactor unit and expresses the average time the reaction product spends in the reactor unit. As is generally known the residence time is defined to be the quotient of the reactor volume divided by the volumetric flow rate. This means that the residence time could be adjusted by tuning the volumetric flow rate of the reaction product in relation to the used volume of the reaction unit. The volumetric flow rate is defined as the volume of the reaction product which passes through the reactor unit per unit of time.

When using an average temperature within the range of 1650 to 1850 K in combination with a residence time as mentioned above and the separation and recycling of unwanted phosphorus containing by-products back to the reactor, the resulting reaction product is obtained in especially high yield and purity.

After that purification step the reaction product contains preferably more than 97, preferably more than 99, particularly at least 99.5 weight percent of $P_4O_6$ based on the total weight, and shows generally a maximum content of elemental phosphorus of less than 3.0, preferably less than 1.0, particularly 0.5 or less weight percent. Under optimum conditions of the process as described herein, the content of elemental phosphorus is even about 0.25 or less weight percent. The content of elemental phosphorus is measured by $^-$P NMR. The final product shows excellent purity which makes it valuable as excellent basic material in the synthesis of organic phosphorus(III)compounds.

An arrangement suitable to carry out the process of the invention of manufacturing $P_4O_6$ by the reaction of phosphorus and oxygen comprises a reaction unit where the reactants and the recycle stream or streams are combined and reacted with each other in a reaction zone. It further comprises a quenching unit connected with one or more outlets of said reaction unit, means for separating at least part of $P_4O_6$ in pure form from the residue of solid by-products, and means for feeding the residue and/or $P_4O_6$ to the reaction unit. Downstream one or more further cooling unit(s) may be arranged to complete cooling of the reaction product. In a preferred embodiment of the invention the volume of the reaction unit is designed to secure the appropriate residence time in relation to the intended volumetric flow of the reaction product. Although generally not necessary, the reaction unit may further comprise means for cooling the reaction unit externally and/or internally for removing the energy generated by the reaction process and maintaining the required temperature. The reaction unit may have any appropriate shape such as a cylindrical chamber or vessel or any other suitable form. The reaction unit further comprises means for passing the reactants involved in the process and the recycle stream of by-products separately or jointly into the reaction zone within the reaction unit, these means may have the form of pipes or tubes allowing directed or undirected dosage of the reactants and/or the stream of by-products through respectively arranged outlets. When the reactants phosphorus and oxygen are combined or get into contact with each other in the reaction zone, they spontaneously react with each other. The reaction can be carried out, for example, by combining the passages of both reactants in the hole of a nozzle. The dosage of the recycle stream, and of an optional temperature control stream of purified or unpurified $P_4O_6$, can be performed jointly with the fresh reactants, or separately. The reaction unit further comprises at least one outlet through which the vaporous reaction product is transferred to the quenching unit. All elements and units are made of suitable material to accomplish the process.

The following Example demonstrates, without limiting the scope of the claimed invention, a preferred embodiment of the process.

EXAMPLE

A stream of 3.99 mole of white phosphorus ($P_4$) per hour was continually fed into an evaporator and evaporated at 770 K at atmospheric pressure. The ensuing stream was fed into the chamber of a reactor of 7800 ml volume. A continuous stream of oxygen gas, 12.0 moles per hour (as $O_2$) was introduced in the same reactor. Through a separate opening in the top of the reactor, a stream of 1105 g/h of a slurry, which had been obtained in a previous experiment, was dosed into the reactor. The slurry consisted of 24 weight % of higher solid P oxides and suboxides, 1% $P_4$ and 75% $P_4O_6$. The slurry was kept at 303 K before dosing. These reaction parameters corresponded to a residence time of 11 seconds in the reactor. The reactor chamber was seen to reach a temperature of 1780 K without external cooling. The reaction product leaving the reactor chamber at its exit was then contacted with a stream of 50 l/h of earlier condensed, liquid reaction product, obtained from previous experiments performed under the same parameters, circulating at 317 K. The reaction product was condensed and cooled down to temperatures of the recirculating liquid which was kept at essentially constant temperature by external cooling.

The experiment was halted after 60 minutes.

The reaction product was subjected to a simple distillation to separate it from high-boiling impurities. After condensation, 875 g of freshly formed reaction product was found, which meant that this amount did not include the material added as coolant in the reactor or the quenching. $^{31}P$ NMR demonstrated that the material was composed of 99.6 weight-% of $P_4O_6$, 0.1 weight-% of $P_4$ and 0.3 weight-% of the mixed higher oxides $P_4O_{7,8,9}$, as well as $P_4O_{10}$. The $P_4O_6$ yield was 99.2% based on the amount of $P_4$ used which is an excellent value, and the content of elemental phosphorus was extremely low.

The invention claimed is:

1. A process for the production of a reaction product consisting essentially of $P_4O_6$ by reacting oxygen, or a mixture of oxygen and an inert gas, with gaseous or liquid phosphorus in an exothermic reaction in a reaction unit maintaining an average temperature in said reaction unit suitable to generate the reaction product, by removing heat created by the exothermic reaction by feeding $P_4O_6$ and/or by-products obtained from earlier reactions producing the reaction product or from the running process into the reaction unit, then quenching the generated reaction product in one or more quenching unit(s) to a lower temperature where no essential decomposition of the reaction product occurs, and separating at least part of $P_4O_6$ from the reaction product obtained after quenching.

2. The process according to claim 1, wherein a stream of by-products consisting of the remaining residue obtained by separating at least part of $P_4O_6$ from the reaction product after quenching, or a fraction thereof, is fed into the reaction unit thereby removing heat created by the exothermic reaction.

3. The process according to claim 2, wherein cooling of the reaction product in the reaction unit is effected by controlling the feeding of a stream of $P_4O_6$ into the stream of by-products, and feeding the resulting stream into the reaction unit.

4. The process according to claim 1, wherein cooling of the reaction product in the reaction unit is solely or additionally effected by controlling the feeding of a stream of $P_4O_6$ into the reaction unit.

5. The process according to claim 1, wherein the temperature of the reaction product in the reaction unit is maintained at an average temperature in the range of 1500 to 2200K.

6. The process according to claim 5, wherein the temperature of the reaction product in the reaction unit is maintained at an average temperature in the range of 1600 to 2000K.

7. The process according to claim 1, wherein the reaction product is maintained in the reaction unit for a residence time of at least 0.5 seconds.

8. The process according to claim 7, wherein the residence time is between 1 and 60 seconds.

9. The process according to claim 1, wherein the molar ratio of phosphorus ($P_4$) to oxygen ($O_2$) is in the range of from 1:2.7 to 1:3.3.

10. The process according to claim 1, wherein the reaction product is quenched to a temperature below 700 K.

11. The process according to claim 1, wherein the reaction product is quenched, or cooled after quenching, to a temperature below the boiling point of point of $P_4O_6$.

12. A process according to claim 1, wherein liquid reaction product and/or liquid $P_4O_6$ is added as a coolant to the reaction product to be quenched.

* * * * *

UNITED STATES PATENT AND TRADEMARK OFFICE
CERTIFICATE OF CORRECTION

PATENT NO. : 8,551,437 B2
APPLICATION NO. : 13/128982
DATED : October 8, 2013
INVENTOR(S) : Willem Johan Schipper It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 362 days.

Signed and Sealed this

Fifteenth Day of September, 2015

Michelle K. Lee
*Director of the United States Patent and Trademark Office*